United States Patent [19]

Hamrick et al.

[11] 4,024,912
[45] May 24, 1977

[54] HYDROGEN GENERATING SYSTEM

[76] Inventors: Joseph T. Hamrick, 6364 Jae Valley Road SE., Roanoke, Va. 24014; Leslie C. Rose, Box 68, Rocky Mount, Va. 24251

[22] Filed: Jan. 29, 1976

[21] Appl. No.: 653,360

Related U.S. Application Data

[63] Continuation-in-part of Ser. No. 611,138, Sept. 8, 1975, Pat. No. 3,982,592, which is a continuation-in-part of Ser. No. 534,778, Dec. 20, 1974, abandoned.

[52] U.S. Cl. .................................. 166/57; 48/61; 166/75 A; 166/272
[51] Int. Cl.[2] ...................... B01J 8/00; E21B 43/24
[58] Field of Search ............... 166/57, 75, 302, 303, 166/272; 48/61

[56] References Cited

UNITED STATES PATENTS

| | | | |
|---|---|---|---|
| 2,734,578 | 2/1956 | Walter | 166/57 X |
| 3,012,607 | 12/1961 | DePriester | 166/57 X |
| 3,066,737 | 12/1962 | Baldwin | 166/302 X |
| 3,598,182 | 8/1971 | Justheim | 166/57 X |
| 3,605,885 | 9/1971 | Leeper | 166/57 |
| 3,833,059 | 9/1974 | Sisson | 166/75 X |
| 3,880,235 | 4/1975 | Berry et al. | 166/302 |

*Primary Examiner*—Stephen J. Novosad
*Assistant Examiner*—George A. Suchfield
*Attorney, Agent, or Firm*—Arthur F. Zobal

[57] ABSTRACT

A partial oxidation process and system for burning crude oil with just enough oxygen in a gas generator to convert all of the carbon to carbon monoxide to form carbon monoxide and free hydrogen. Water or steam is added and the gas water reaction carried out over an iron base catalyst to produce carbon dioxide and more hydrogen. Atomizing means is provided for atomizing the oil with steam for injection into the gas generator. In hydrocarbon recovery operations, the carbon dioxide and hydrogen are passed through a turbine for cooling while performing work. The gases from the turbine are passed through a first cooler; compressed by a compressor; and then applied to a second cooler which liquifies the carbon dioxide for separation from the hydrogen. The hydrogen is then conveyed to a downhole gas generator.

10 Claims, 6 Drawing Figures

HYDROGEN GENERATING SYSTEM

This application is a continuation-in-part of U.S. patent application Ser. No. 611,138, filed Sept. 8, 1975, now U.S. Pat. No. 3,982,592, which is a continuation-in-part of U.S. Pat. application Ser. No. 534,788 filed Dec. 20, 1974, abandoned.

SUMMARY OF THE INVENTION

It is an object of the present invention to provide a process and system for partially oxidizing hydrocarbons employing a gas generator. In operation, hydrocarbons are burned in the generator with just enough oxygen to convert substantially all of the carbon to carbon monoxide to form carbon monoxide and free hydrogen. When oil is burned in the generator, atomizing means is provided for atomizing the oil for injection into the generator.

In a further aspect, reforming means containing a catalyst is coupled to the output of the generator for receiving the carbon monoxide and hydrogen. Means is provided for adding water or steam to the reforming means to produce carbon dioxide and more hydrogen which are then separated to obtain hydrogen for the desired purpose.

It is a further object of the present invention to provide a process and system for producing hydrogen for use for recovering hydrocarbons and other fluids from underground formations containing hydrocarbons penetrated by a borehole. Preferably the partial oxidation system employing the gas generator and reforming means is used in the hydrocarbon recovery operations. The gases from the reforming means are cooled and compressed and then applied to means for separating the carbon monoxide from the hydrogen. The hydrogen is applied to a utilization device located in a borehole which penetrates the formations containing the sought after hydrocarbons. Preferably the utilization device in the borehole also is a gas generator.

DETAILED DESCRIPTION OF THE INVENTION

Figure 1:
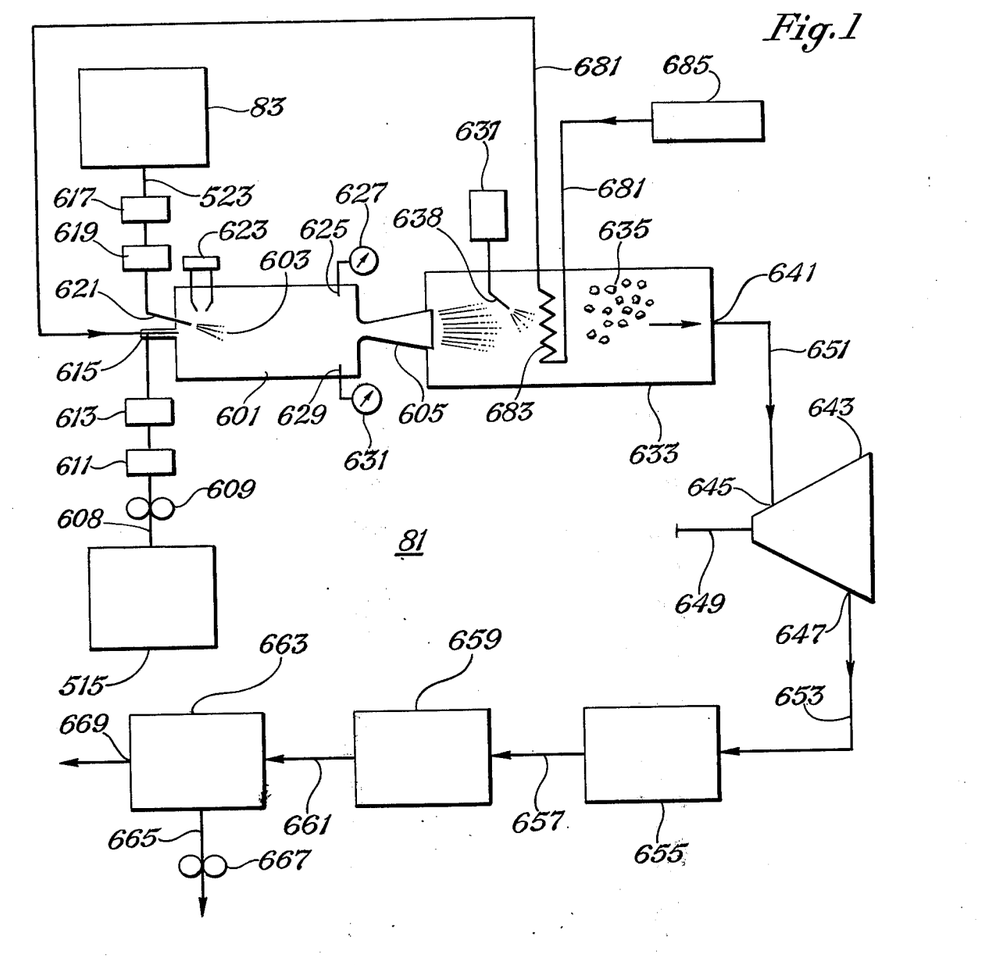
FIG. 1 is a schematic diagram of a system for generating hydrogen with crude oil and oxygen.

Referring now to FIG. 1, the system shown is identified by reference numeral 81 and is located at the surface. The system includes a gas generator 601 comprising a chamber having a combustion zone 603 and a restricted outlet 605. Crude oil is supplied to the gas generator from a crude oil supply 515 by way of a conduit 608, a pump 609, a metering valve 611, a flow meter 613, and an atomizer 615. Oxygen is supplied to the gas generator from an oxygen supply 83 by way of a conduit 523, a metering valve 617, a flow meter 619, and an injector 621. The atomized oil and oxygen are mixed in the combustion zone of the chamber to form a combustible mixture which is ignited by an electrical igniter 623 and burned. After ignition, the igniter 623 may be shut off. The oil is burned with just enough pure oxygen in the gas generator to convert substantially all of the carbon of the oil to carbon monoxide to form carbon monoxide and free hydrogen which are injected through the outlet 605. The temperature and pressure near the outlet may be monitored by a thermocouple 625 connected to a meter 627 and a pressure transducer 629 connected to a meter 631. By monitoring the temperature and pressure with the meters 627 and 629 and the oil and oxygen flow rates with the meters 613 and 619, the metering valves 611 and 617 may be adjusted manually to allow the proper amount of oil and oxygen to be injected into the gas generator to convert substantially all of the carbon to carbon monoxide to form carbon monoxide and free hydrogen. The valves 611 and 617 also may be controlled automatically although an automatic control system is not shown.

The carbon monoxide and hydrogen from the outlet 605 are injected into a reformer chamber 633 containing an iron base catalyst 635. Steam or water is added to the reformer chamber from a supply 637 and nozzle 638 and the water gas reaction is carried out over the iron base catalyst 635. The carbon monoxide reacts with the water as it is introduced into the reformer chamber to form carbon dioxide and more hydrogen. The hydrogen and carbon dioxide leave the chamber 633 by way of outlet 641 and pass through a turbine 643 in which the gases are cooled to a lower temperature while producing work. The temperature out of the turbine will depend upon the turbine design and the turbine outlet pressure. The turbine has an inlet 645 and an outlet 647. In operation, the turbine will drive shaft 649 to drive pumps, compressors, etc. The gas from the chamber 633 are applied to the inlet 645 by way of a conduit illustrated at 651. The gases leaving the turbine through outlet 647 are applied by way of a conduit 653 to a first cooler 655 which may comprise suitable cooling coils exposed to air or to water. The gases from the cooler 655 are applied by way of a conduit 657 to a compressor 659 to compress the gases to a desired pressure. From the compressor 659 the gases are applied by way of a conduit 661 to a second cooler 663 which in one embodiment may also comprise suitable cooling coils exposed to air or to water. The carbon dioxide is liquified by the second cooler 663 where it is drawn off through an outlet 665 and pumped to a reservoir by way of a pump illustrated at 667. The separated hydrogen passes from the second cooler 663 by way of an outlet and is conveyed to a downhole utilization device. The downhole utilization device preferably is a gas generator located in a borehole as will be described subsequently.

As one example, in using the system of FIG. 1 for producing hydrogen, consider one pound of crude oil having an analysis by weight of 0.8505 pounds of carbon, 0.1230 pounds of hydrogen, 0.0175 pounds of sulphur, and 0.0070 pounds of nitrogen, etc. When reacted with 1.12 pounds of pure oxygen, a pound of crude oil provides 1.9 pounds of carbon monoxide, 0.127 pounds of hydrogen, and 0.0075 pounds of sulphur. The higher heating value of the crude oil is 18,910 Btu per pound. Substracting from this value 16,310 Btu, the heat of reaction that would be generated by complete combustion of the carbon monoxide, hydrogen, and sulphur, a total of 2600 Btu remains to heat up the reaction products. The computed final temperature for the reaction products out of the generator 601 is 2500° F. If the products are mixed with water and passed over an iron catalyst in the reformer 633, the resulting products per pound of crude oil are 0.267 pounds of hydrogen and 3.08 pounds of carbon dioxide at a temperature of 1470° F and a pressure of 1100 psi. The carbon dioxide may be removed as a liquid by compressing the mixture to approximately 1000 psi at 80° F or 305 psi at 0° F. Thus, the compressor 659 may be operated to compress the gases at 1000 psi or 305 psi. As an alternative the carbon dioxide may be removed by scrubbing with water under pressure.

Referring again to the gas generator 601 and the reforming chamber 633, a conduit 681 connected to a source 685 extends into the chamber 633 where it is coiled at 683 to form a heat exchanger. From coil 683 the conduit 681 extends out of the reformer chamber and has its outlet end connected to the atomizer 615. Water is injected from the source 685 into the conduit 681 where it is formed into super heated steam at 1470° F which then is conveyed to the atomizer 615 for use in atomizing the oil.

Figure 2:
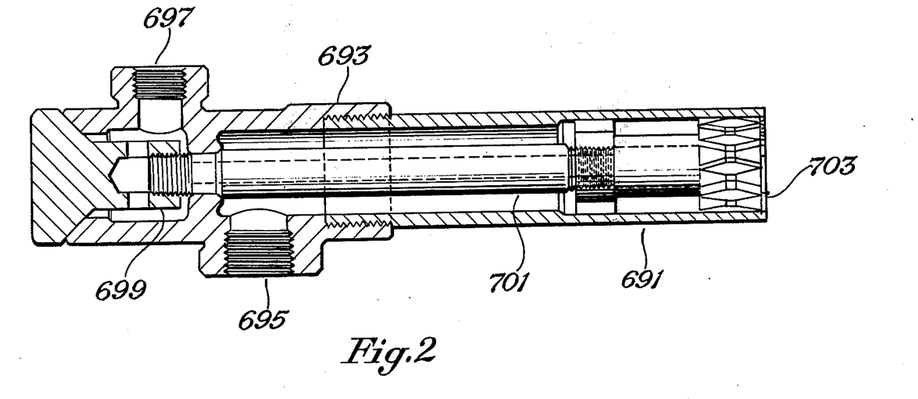
FIG. 2 is an enlarged cross-sectional view of an atomizer which may be employed in the system of FIG. 1.

Referring to FIG. 2, one type of atomizer which may be employed is illustrated and comprises a casing 691 threaded into a body 693, the latter of which has a compressed air or steam inlet 695 and an oil inlet 697. Also provided is a nut plug 699, a nipple 701, and a core 703. In the system of FIG. 1, oil conduit 608 is coupled to the oil inlet 697 and the outlet end of steam conduit 681 is coupled to the inlet 695 of the atomizer 615 to atomize the oil which is injected through the core 703 into the gas generator. The atomizer of FIG. 2 is a high pressure oil burner commercially available from Hawk Manufacturing Co., P.O. Box 90, Lebanon, Pa. 17042.

In the system of FIG. 1, the pump 609 is operated at 1200 psi while the oxygen is supplied from supply 83 at 1200 psi. Although not shown, heat exchanger coils may extend from a water source around or into and out of the gas generator 601 to heat water to form steam for injection through the nozzle 638 into the reformer chamber 633.

Figure 3:
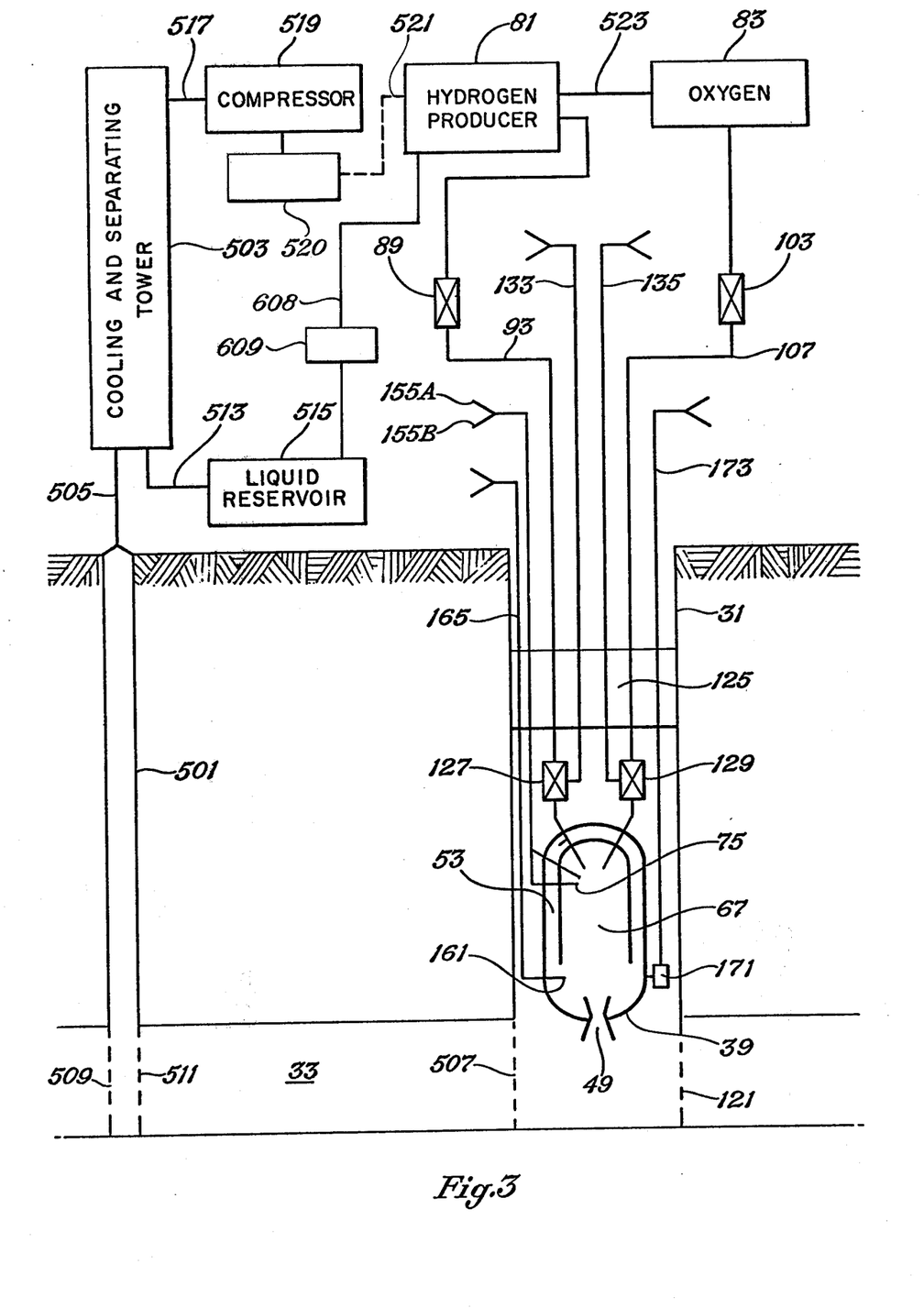
FIG. 3 schematically illustrates a gas generator located in a borehole which penetrates a hydrocarbon bearing formation and a spaced production well for recovering hydrocarbons from the formation.

Referring now to FIG. 3, there will be described briefly the system 81 of FIG. 1 employed in a recovery system for carrying out insitu hydrogenation employing a gas generator in a borehole for burning a hydrogen rich mixture of hydrogen and oxygen. It is to be understood that the borehole system could be operated in a different manner for carrying out different types of downhole operations. In FIG. 3, there is illustrated a cased injection borehole 31 which penetrates a subsurface oil bearing reservoir 33. Spaced from the borehole 31 is a production borehole 501. Although not shown some other spaced production boreholes may be employed. Located in the borehole 31 is a gas generator 39 which is supplied with hydrogen and oxygen from the hydrogen producer 81 and the oxygen supply 83 located at the surface. The borehole casing 121 is sealed above the generator by a packer 125. A cooling and separating tower 503 is located at the surface and is coupled to the production well 501 by way of conduit illustrated at 505.

The gas generator 39 comprises a chamber having a combustion zone 67, a cooling annulus 53 and a restricted outlet 49. Hydrogen from producer 81 is deliverd through modulating valve 89 and conduit 93 to the gas generator. Similarly oxygen from supply 83 is delivered through modulating valve 103 and conduit 107 to the gas generator. Hydrogen at the generator is admitted to the combustion zone 67 and cooling annulus 53 by means of solenoid valve 127 which is controlled at the surface by means of leads illustrated at 133. Oxygen is admitted to combustion zone 67 by means of solenoid valve 129 which is controlled at the surface by means of leads illustrated at 135. The amount of hydrogen delivered is sufficient to form a hydrogen-rich mixture in the gas generator which is ignited by applying electric current to leads 155A and 155B to energize glow plug or spark plug 75. Thermocouple 161 senses the temperature near the gas generator exhaust port and transmits temperature data through leads illustrated at 165 to the surface. Similarly pressure transducer 171 transmits data through leads illustrated at 173.

In carrying out the recovery process, hydrogen and oxygen are fed to the gas generator 39 to form a hydrogen-rich combustible mixture which is ignited and burned to generate hot gases which pass through the restricted outlet 49 and enter the well bore 31. From the well bore the gases pass into the bed 33 through perforations 507 formed through the well casing. The hot gases which are composed primarily of steam and hydrogen pass into the reservoir 33.

By means of modulating valve 89 and 103 the temperature of the exhaust gases from the gas generator is regulated to heat the oil in the formations to a temperature sufficient to break the hydrocarbon chains into ligher segments and the segments reacted with hot hydrogen from the gas generator to form lighter and less viscous end products. For example, the formations may be heated to temperatures of 750° F or greater at a pressure of approximately 2000 psi. The outputs of thermocouple 161 and transducer 171 are monitored to aid in obtaining the desired temperatures and pressures, it being understood that the temperatures and pressures existing in the formation bed will be less than those measured in the borehole. For so called depleted reservoirs which contain residual oil which occupy 20 to 24% of the pore space in the bed formation, it is necessary to heat the bed above 750° F and possibly as high as approximately 1100° F to adequately crack the oil. The 1100° F upper limit is desirable to prevent decomposition of methane into carbon and hydrogen and which occurs at about 1200° F. The process is slightly different from the normal hydrocracking process in that the underground bed may not contain the proper catalytic agents and thermal cracking must occur before hydrogenation.

For some reservoirs, it may not be necessary to thermally crack the oil, but to apply hydrocracking because of the wide variety of trace elements present in some beds that may act as catalysts for the hydrocracking process. As is well known hydrocracking is the combination of mild thermal cracking and hydrogenation which can be carried out at lower temperatures in the presence of a suitable catalyst. With some catalysts, hydrocracking may proceed at temperatures as low as 500° F and 500 psi. The temperatures, however, may be higher with an upper limit of about 800° F. For a detailed discussion of thermal cracking and hydrogenation and hydrocracking reference is made to the report "Impact of New Technology on the U.S. Petroleum Industry 1946-1965" by the National Petroleum Council, Library of Congress Catalog Card No. 67-31533.

If thermal cracking without catalysts followed by hydrogenation is to be employed, initially the gases may be introduced at temperatures in the vicinity of 1300° F to 1600° F to compensate for rapid heat transfer in the bed. Subsequently the temperatures may be reduced to 900° F to induce initial thermal cracking of the oil in the heated reservoir and as the reservoir reaches minimum thermal cracking temperature the gas generator exhaust may be reduced to 750° F, with dependency upon heat of hydrogenation to raise the temperature in the front moving across the reservoir for cracking purposes.

If the composition of the bed is unknown, the gas generator may be initially operated to produce gases at a lower temperature to determine if lighter hydrocarbons can be recovered from well 501 by hydrocracking. If no recovery is had, the gas generator may be operated at the higher temperature to induce thermal cracking and then hydrogenation. The gas and liquids resulting from hydrogenation whether by thermal cracking without catalysts followed by hydrogenation or by hydrocracking move through perforations 509 formed through the borehold casing 511, and into the borehole 501 to the surface. Although not shown, well known pumping equipment for the production well 501 may be used if necessary. At the surface the gases and liquids move through conduit 505 to the cooling and separating tower 503. The liquids and gases are separated in the tower and the liquids move through the conduit 513 to reservoir 515. The gases may be applied to a conduit 517 and then to a compressor 519 which compresses the gases and applies them to a storage system 520 for storing the gases under pressure. Crude oil from reservoir 515 then is pumped by pump 609 through conduit 608 to the hydrogen producer 81 as described above. Oxygen under pressure is supplied to the hydrogen producer 81 through conduit 523 as described above. The oxygen source 83 may be a tank which is filled from a commercial supply or from an on site air to oxygen converter.

If is is assumed that 50 lbs. of hydrogen per million Btu per hour will be the rate of consumption (16.4 lbs. for heating and 33.6 lbs. for hydrocracking), the weight of crude oil required per million Btu will be 187 pounds or 0.64 barrels. The weight of oxygen required will be 210 lbs. for hydrogen production and 130 lbs. downhole. The energy required to produce the oxygen will be approximately 82 kw-hr. if an on the site air to oxygen converter is employed. The foregoing does not include the energy required to compress the gases to the required pressure for introduction into the downhole gas generator. Nevertheless, the main outside requirement is the 82 kw-hr. for oxygen production. The 82 kw-hr. requirement can be generated by a gas turbine generator operated on crude oil. For 20 million Btu/hr. the generator would be in the 1000 kw range.

Instead of using crude oil as the fuel for the gas generator 601 of the uphole hydrogen producer 81, in some cases it may be desirable to use natural gas. The natural gas may be supplied from the storage system 520 by way of a conduit 521, as shown as a dotted line, coupled to the gas generator 601. In this embodiment the atomizer 615, and the heat exchanger 681 and 683 will not be employed. An advantage in using natural gas is that the injection and mixing of the gas and oxygen in the generator can be more easily accomplished than atomization of oil for mixing with the oxygen. By use of a steam atomizing injector to atomize the oil, this drawback can be overcome to a large extent even with heavy oils. The steam reduces the oil viscosity and assists in atomization as both are injected together into the gas generator. The use of steam per pound of oil may vary from 0.1 to 0.8 lbs. In addition to making possible good atomization, changing the ratio of steam to oil can control the reaction between the oil and oxygen. Steam injected in this manner may also react more readily with the Co that is formed to produce $H_2$ and $CO_2$.

Figure 5A:
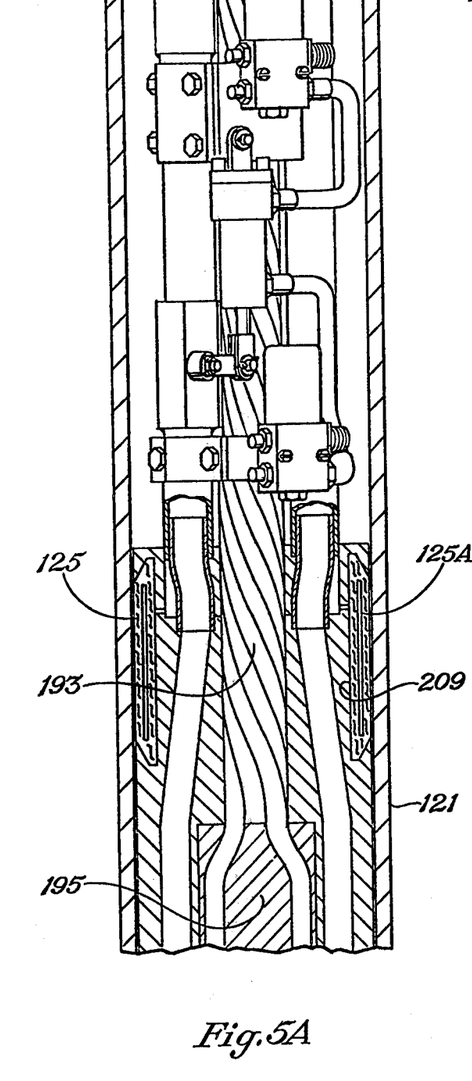
FIG. 5A is an enlarged cross-sectional view of the top portion of the downhole housing structure for supporting the gas generator in a borehole.
Figure 5B:
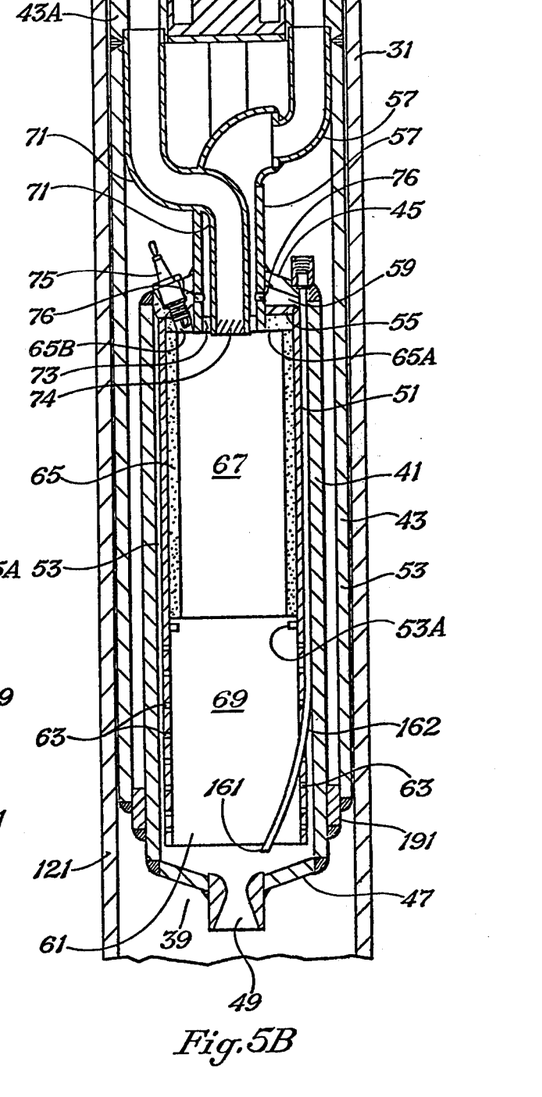
FIG. 5B is an enlarged partial cross-sectional view of the lower portion of the housing of FIG. 5A showing the gas generator. The complete housing with the gas generator, may be viewed by connecting the lower portion of FIG. 5A to the top portion of FIG. 5B.

Referring to FIGS. 5A and 5B, the gas generator 39 comprises an outer cylindrical shell 41 supported in a housing 43 located in the borehole. The outer shell 41 has an upper end 45 through which supply conduits and other components extend and a lower end 47 through which a small diameter outlet nozzle 49 extends. Supported within the outer shell 41 is an inner shell 51 which forms the cooling annulus 53 between the inner shell and the outer shell. The inner shell has an upper wall 55 which is connected to a conduit 57 which in turn extends through upper wall 45 and is connected thereto. The conduit 57 forms the fuel supply conduit, as will be described subsequently and also supports the inner shell 51 within the outer shell, forming the annulus 53 and also forming an upper space 59 between the walls 45 and 55. The space 59 is in communication with the annulus 53. The opposite end of the inner shell 51 is open at 61. Formed through the inner shell at the lower end thereof are a plurality of apertures 63 which provide passages from the annulus 53 to the interior of the inner shell for the flow of cooling fluid. Supported in the inner shell at its upper end is a heat resistant liner 65 which defines a primary combustion zone 67. The liner is supported by a retention ring 53A and has an upper wall portion 65A through which supply conduits and other components extend. The portion of the interior shell at the level of the apertures 63 is defined as a mixing zone 69.

Conduit 57 extends through walls 45 and 55 and through the upper liner wall 65A to the primary combustion zone 67. Concentrically located within the conduit 57 and spaced inward therefrom is a conduit 71 which also extends to the combustion zone 67. Hydrogen is supplied through the annulus formed between conduits 57 and 71 while oxygen is supplied through conduit 71. Swirl vanes 73 and 74 are provided in the annulus between conduit 71 and conduit 57, and in conduit 71 to mix the oxygen with the fuel to form a combustible mixture which is ignited in the combustion zone by the igniter 75 and burned. As illustrated, the igniter 75 comprises a spark plug or electrode which extends through walls 45 and 55 and into an aperture 65B formed through the upper liner wall 65A whereby it is in fluid communication with the gases in the combustion zone 67.

An excess of hydrogen is introduced into the combustion zone of the gas generator to form a hydrogen-rich mixture for reducing the temperature in the primary combustion zone of the gas generator and for providing an excess of hot hydrogen for insitu hydrogenation. Hydrogen can also be suppled to annulus 53 through perforations 76 formed in conduit 57 to provide communication with the space 59 formed between the walls 45 and 55. From the space 59 the hydrogen flows into annulus 53. The hydrogen flowing through annulus 53 cools the inner shell 51 and flows through apertures 63 to cool the combustion gases to the desired temperature. As the hydrogen flowing through annulus 53 and into the mixing zone 69 performs its cooling function it is heated to provide an additional supply of hot hydrogen for hydrogenation. The steam derived from the combustion of the hydrogen and oxygen and the excess hot hydrogen then flow through the outlet nozzle 49 into the formations. Since the exhaust nozzle 49 is small compared with the diameter of the combustion zone, the behavior of gases generated in the gas generator is not affected by the external pressure (pressure of the oil reservoir) until the external pressure approaches the critical pressure of approximately 57% of the value of the internal pressure. Therefore, for a set gas generator pressure, there is no need to vary the flow rate of the ingredients into the generator until the external pressure (oil reservoir pressure) approaches approximately 57% of the internal gas pressure. The behavior of gases in the generator is not significantly affected until the external pressure reaches 80% of internal.

Figure 4:
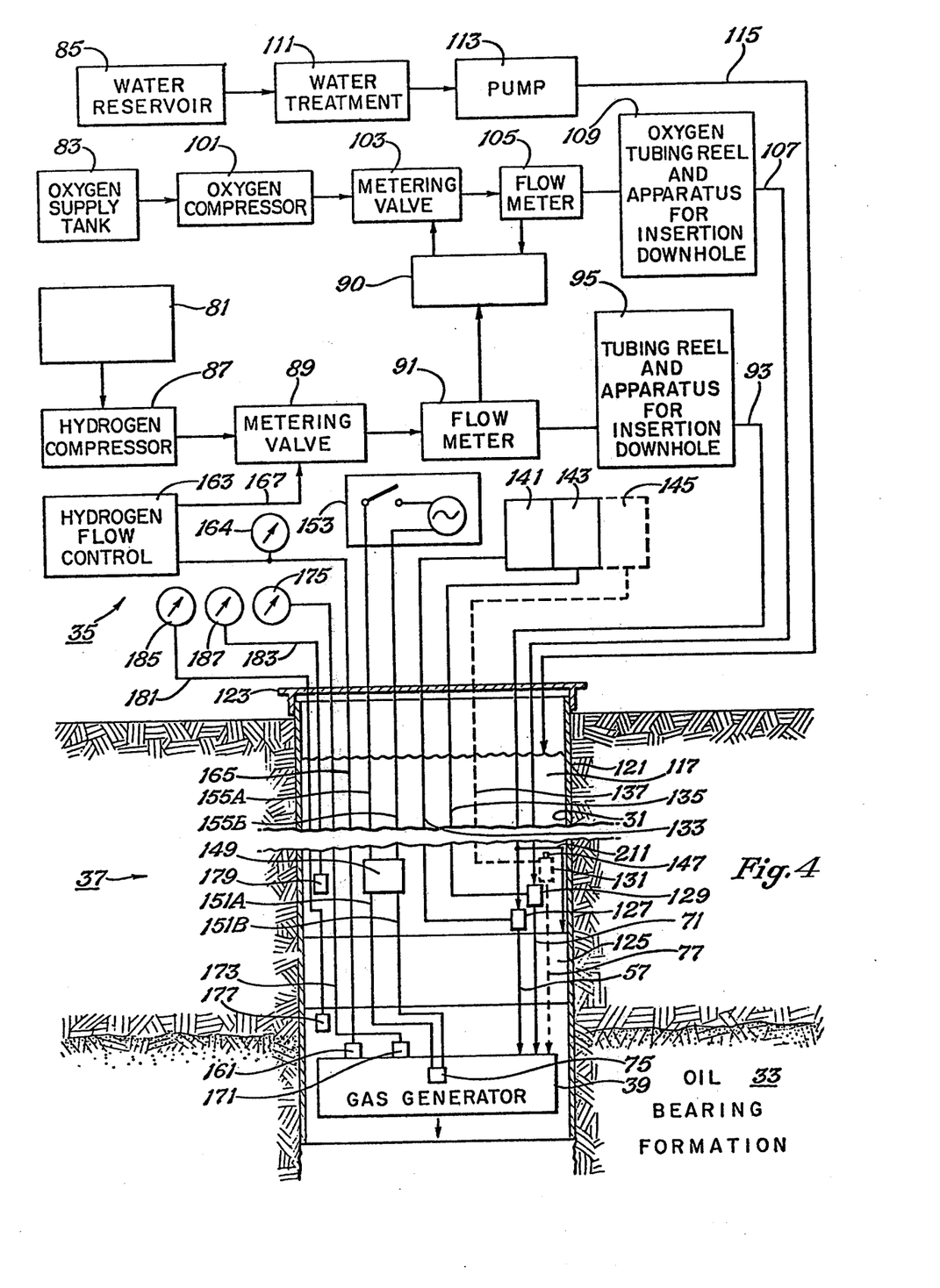
FIG. 4 illustrates more detailed of the uphole and downhole system for operating the gas generator in the borehole.

Referring to FIG. 4, the hydrogen and oxygen are supplied to the generator located downhole by way of the hydrogen supply or producer 81, and oxygen supply 83 as indicated above. Hydrogen is supplied by way of a compressor 87 and then through the metering or modulating valve 89, a flow meter 91, and through conduit 93 which is inserted downhole by a tubing reel and apparatus 95. Oxygen is supplied downhole by way of a compressor 101, and then through the metering or modulating valve 103, a flow meter 105, and through conduit 107 which is inserted downhole by way of a tubing reel and apparatus 109. Water can be used in addition to hydrogen for cooling the generator, and it can be provided from an uphole water reservoir 85. From the water reservoir 85, the water is supplied to a water treatment system 111 and then pumped by pump 113 through conduit 115 into the borehole 31. In FIG. 4, water in the borehole is identified at 117.

The borehole 31 is cased with steel casing 121 and has an upper well head 123 through which all of the conduits, leads, and cables extend. Located in the borehole above and near the gas generator is a packer 125 through which the conduits, cables, and leads extend. The flow of hydrogen and oxygen to the generator is controlled by solenoid actuated valves 127 and 129 which are located downhole near the gas generator above the packer. Valves 127 and 129 have leads 133 and 135 which extend to the surface to solenoid controls 141 and 143 for separately controlling the opening and closing of the downhole valves from the surface. The controls 141 and 143 in effect, are switches which may be separately actuated to control the application of electrical energy to the downhole coils of the valves 127 and 129. Valve 127 is coupled to hydrogen conduits 93 and 57 while valve 129 is coupled to oxygen conduits 107 and 71.

The igniter 75 is coupled to a downhole transformer 149 by way of leads 151A and 151B. The transformer is coupled to an uphole ignition control 153 by way of leads 155A and 155B. The uphole ignition control 153 comprises a switch for controlling the application of electrical energy to the downhole transformer 149 and hence to the igniter 75. The thermocouple 161 is supported by the gas generator and is electrically coupled to an uphole hydrogen flow control 163 by way of leads illustrated at 165. The hydrogen flow control senses the temperature detected by the thermocouple and produces an output which is applied to the metering valve 89 for controlling the flow of hydrogen to obtain the desired hydrogen-oxygen ratio. The output from the flow control 163 may be an electrical output or a pneumatic or hydraulic output and is applied to the valve 89 by way of a lead or conduit illustrated at 167.

Also supported by the gas generator is the pressure transducer 171 which in FIG. 4 is shown located in the space between the gas generator and packer for sensing the pressure in the generator. Leads illustrated at 173 extend from the transducer 171 to the surface where they are coupled to a meter 175, for monitoring purposes. Also provided below and above the packer are pressure transducers 177 and 179 which have leads 181 and 183 extending to the surface to meters 185 and 187 for monitoring the pressure differential across the packer.

Referring again to FIGS. 5A and 5B, the gas generator 39 is secured to the housing 43 by way of an annular member 191. The housing in turn is supported in the borehole by a cable 193. As illustrated, cable 193 has its lower end secured to a zinc lock 195 which is secured in the upper portion 43A of the housing. The upper portion of the housing has an annular slot 209 formed in its periphery in which is supported the packer 125. The packer is an elastic member that may be expanded by the injection of gas into an inner annulus 125A formed between the inner and outer portions of the packer. In the present embodiment, hydrogen from the hydrogen conduit is employed to inflate the packer to form a seal between the housing 43A and the casing 121 of the borehole. Hydrogen is preferred over oxygen since it is non-oxidizing and hence will not adversely affect the packer. Hydrogen from the hydrogen conduit 57 is injected into the annulus 125A by way of a conduit 211 which is coupled to the hydrogen conduit 93 above the downhole valve 127. See also FIG. 4.

With the downhole system in place in the borehole, as illustrated in FIG. 4, and all downhole valves closed, the start-up sequence is as follows. Hydrogen and oxygen are admitted to the downhole piping and brought up to pressure by opening metering valves 89 and 103. The hydrogen inflates the packer 125 and forms a seal between the housing 43A and the borehole casing 121, upon being admitted to the downhole pipe 93. Water, may then be admitted to the well casing and the casing filled or partially filled. This is accomplished by actuating pump 113. Water further pressurizes the downhole packer seal. The ignition control 153 and the oxygen and hydrogen solenoid valves 127 and 129 are set to actuate, in the proper sequence, as follows. The igniter is started by actuating control 153; the oxygen valve 129 is opened by actuating control 143 to give a slight oxygen lead; the hydrogen valve 127 is then opened by actuating control 141. This sequence may be carried out by manually controlling controls 141, 143 and 153 or by automatically controlling these controls by an automatic uphole control system. At this point, a characteristic signal from the downhole pressure transducer 171 will show on meter 175 whether or not a normal start was obtained and the thermocouple will show by meter 164, connected to leads 165, whether or not the desired temperature is being maintained. The hydrogen flow controller 163 is slaved to thermocouple 161 which automatically controls the hydrogen flow. The hydrogen to oxygen ratio may be controlled by manually controlling the hydrogen and oxygen valves, electrically controlling the valves with a self synchronizing motor or by feeding the output from flow meters 105 and 91 into a comparator 90 which will provide an electrical output for moving the oxygen metering valve in a direction that will keep the desired hydrogen-oxygen ratio. The comparator may be in the form of a computer which takes the digital count from each flow meter, computer the required movement of oxygen metering valve and feeds the required electrical, pneumatic, or hydraulic power to the valve controller to accomplish it. Such controls are available commercially. The flow rate through the metering valve 89 is controlled by electrical communication through conduit 167 from the hydrogen flow controller 163. Communication from the hydrogen flow controller 163 to metering valve 89 optionally may be by pneumatic or hydraulic means through an appropriate conduit. At this point, the flow quantities of hydrogen and oxygen are checked to ascertain proper ratios of hydrogen and oxygen. Monitoring of the flow of hydrogen and oxygen is carried out by observing flow meters 91 and 105. The flow rate meters or sensor 91 and 105 in the hydrogen and oxygen supply lines at the surface also may be employed to detect pressure changes in the gas generator. For example, if the gas generator should flame out, the flow rates of fuel and oxidizer will increase, giving an indication of malfunction. If the reservoir pressure should equal the internal gas generator pressure, the flow rates of the fuel and oxidizer would drop, signaling a need for a pressure increase from the supply. Adjustment of the flow quantities of hydrogen and oxygen can be made by adjusting the supply pressure. Both valves 89 and 103 may be adjusted manually to the desired initial set value.

At this point, the gas generator is on stream. As the pressure below the packer builds up, there may be a tendency for the packer to be pushed upward and hot gases to leak upward into the well casing both of which are undesirable and potentially damaging. This is prevented, however, by the column of water maintained in the casing and which is maintained at a pressure that will equal or exceed the pressure of the reservoir below the packer. For shallow wells, it may be necessary to maintain pressure by pump 113 in addition to that exerted by the water column. For the deep wells, it may be necessary to control the height of the water column in the casing. This may be accomplished by inserting the water conduit 115 in the borehole to an intermediate depth with a float operated shut off valve; by measuring the pressures above and below the packer; by measuring the pressure differential across the packer; or by measuring the change in tension on the cable that supports the packer and gas generator as water is added in the column. Flow of water into the casing 121 will be shut off if the measurement obtained becomes too great. Water cut-off would be automatic. In addition, a water actuated switch in the well may be employed to terminate flow after the well is filled to a desired height. The pressure and pressure differential can be sensed by commercially available pressure transducers, such as strain gages, variable reluctance elements or piezoelectric elements, which generate an electrical signal with pressure change. Changes in the cable tension can be sensed by a load cell supporting the cable at the surface. In the embodiment of FIG. 4, pressure above and below the packer is measured by pressure transducers 177 and 179, their outputs of which are monitored by meters 185 and 187 for controlling flow of water into the casing 121. On stream operation of the gas generator may extend over periods of several weeks.

In shut down operations, the following sequence is followed. The downhole oxygen valve 129 is shut off first, followed by shut off of the hydrogen valve 127. Shut off of the igniter is accomplished manually or by timer after start-up is achieved.

It is necessary for start-up and operation of the gas generator to locate the valves downhole just above the packer to assure an oxygen lead at start-up and positive responses to control. Use of the downhole remotely controlled valves 127 and 129 has advantages in that they provide positive control at the gas generator for the flow of fluids to the generator. The downhole valves 127 and 129 may be cylinder actuated ball type valves which may be operated hydraulically, using solenoid valves to admit pressure to the actuating cylinder. When water is employed in the borehole, it will be necesary to exhaust one port of the solenoid valves below the downhole packer. Further, for more positive actuation, it may be desirable to use unregulated water pressure as the actuating fluid, as it will provide the greatest pressure differential across the packer.

Referring again to the packer 125, initial sealing is effected by pneumatic pressure on the seal from the hydrogen pressure and finally from pressure exerted by the water column. Thus, the packer uses pneumatic pressure to insure an initial seal so that the water pressure will build up on the top side of the seal. Once the water column in the casing reaches a height adequate to hold the seal out against the casing, the pneumatic pressure is no longer needed and the hydraulic pressure holding the seal against the casing increases with the water column height. Hence, with water exerting pressure on the pneumatic seal in addition to the sealing pressure from the hydrogen, there will be little or no leakage past the packer. More important, however, is the fact that no hot gases will be leaking upward across the packer since the down side is exposed to the lesser of two opposing pressures. In addition to maintaining a positive pressure gradient across the packer, the water also acts as a coolant for the packer seal and components above the packer. The seal may be made of viton rubber or neoprene. The cable suspension system acts to support the gas generator and packer from the water column load. In one embodiment, the cable may be made of plow steel rope.

In one embodiment the downhole generator may be employed in a borehole casing having an inside diameter of 6.625 inches. The outer shell 41 (FIG. 5B) and the inner shell 51 of the gas generator may be formed of 304 stainless steel. The wall of the outer shell 41 may be ⅜ of an inch thick while the wall of the inner shell 51 may be ⅛ of an inch thick. The liner 65 may be formed of graphite with a wall thickness of 5/16 of an inch. It extends along the upper 55% of the inner shell. As the inner shell 51 is kept cool by the hydrogen it will not expand greatly. The graphite also will be cooled on the outer surface and therefore will not reach maximum temperature. The guide vanes 74 in the oxygen tube 71 swirl the incoming oxygen in one direction and guide vanes 73 in the hydrogen annulus between tubes 71 and 57 swirl the hydrogen in a direction opposite that of the oxygen. The oxygen, being heavier than the hydrogen, is centrifuged outward, mixing with the hydrogen. A spark is provided for igniting the hydrogen by means of the electrode 75, as mentioned above. The thermocouple 161 is housed in a sheath of tubing 162 running from the top of the generator to a point near the exhaust nozzle 49 and senses the temperature at that point. This temperature measurement is used to control the fuel-oxidizer flow to the gas generator to maintain a desired exhaust temperature. The pressure transducer 171 (FIG. 4) allows monitoring of the generator pressure. It is located in the space between the generator and packer. The area of the exhaust nozzle for a nozzle coefficient of 100% is 0.332 inches square. For a nozzle coefficient of 0.96, the area is 0.346 inches square for a diameter of 0.664 of an inch. The inside diameter of the outer shell 41 may be 4.3 inches, and the inside diameter of the inner shell 3.65 inches. For these dimensions, the nozzle 49 may have a minimum inside diameter of 0.664of an inch. The flow quantity from the gas generator is not affected by oil reservoir pressure until the resevoir reaches the critical pressure ratio of approximately 0.57. It is not greatly affected until reservoir pressure ratio reaches 0.800, after which flow rate drops off rapidly. With the high pressures that are associated with a gas generator, a plug can be inserted in the nozzle 49 before the generator is lowered into the borehole, so that it can be blown out upon start-up of the gas generator. The plug will be employed to prevent borehole liquid from entering the generator when it is lowered in place in the borehole. Further, because of the continued availability of high pressure and small area required, a check valve downstream of the nozzle can be provided so that upon shut down of the gas generator, the check valve will close, keeping out any fluids which could otherwise flow back into the generator.

Although not shown, it is to be understood that suitable cable reeling and insertion apparatus will be employed for lowering the gas generator into the borehole by way of cable 193. In addition, if the water conduit 115 is to be inserted into the borehole to significant depths, suitable water tubing reel and apparatus similar to that identified at 95 and 109 will be employed for inserting the water tubing downhole.

The hydrogen and oxygen metering valves 89 and 103 will have controls for manually presetting the valve openings for a given hydrogen-oxygen ratio. Valve 103 is slaved to valve 89, as indicated above. The valve openings may be changed automatically for changing the flow rates therethrough by the use of hydraulic or pneumatic pressure or by the use of electrical energy. If the metering valves are of the type which are actuated by hydraulic or pneumatic pressure, they may include a spring loaded piston controlled by the hydraulic or pneumatic pressure for moving a needle in or out of an orifice. If the metering valves are of the type which are actuated electrically, they may include an electric motor for controlling the opening therethrough. Suitable metering valves 89 and 103 may be purchased commercially from companies such as Allied Control Co., Inc. of New York, N.Y., Republic Mfg. Co. of Cleveland, Ohio, Skinner Uniflow Valve Div. of Cranford N.J., etc. In the alternative, valves 89 and 103 may be controlled manually if desired.

In the embodiment of FIG. 4, valve 89 is actuated automatically by thermocouple signal. The downhole thermocouple 161 produces an electrcal signal representative of temperature and which is applied to the hydrogen flow control 163. If the metering valve 89 is electrically activated, the hydrogen flow control produces an appropriate electrical output, in response to the thermocouple signal, and which is applied to the valve by way of leads 167 for reducing or increasing the flow rate therethrough. If the valve 89 is hydraulically or pneumatically actuated, the hydrogen flow control 163 will convert the thermocouple signal to hydraulic or pneumatic pressure for application to the valve 89 for control purposes. In the alternative valves 89 and 103 may be controlled manually if desired.

The flow meters 91 and 105 may be of the type having rotatable vanes driven by the flow of fluid therethrough. The flow rate may be determined by measuring the speed of the vanes by the use of a magnetic puckup which detects the vanes upon rotation past the pickup. The output count of the magnetic pickup is applied to an electronic counter for producing an output representative of flow rate.

As indicated above, an excess of hydrogen (hydrogen-rich) is introduced into the combustion zone of the gas generator for reducing the temperature in the primary combustion zone of the gas generator and to provide an excess of hot hydrogen for hydrogenation of the oil to form less viscous hydrocarbons. The maximum temperature produced by burning hydrogen stoichiometrically with oxygen is about 5000° F or slightly higher at atmospheric pressure. By employing a hydrogen-rich mixture the temperature in the primary combustion zone may be reduced to as low as 1800° F without causing flame-out. Reduction of the temperature in the primary combustion zone with a hydrogen-rich mixture has advantages in that it allows the gas generator to be fabricated out of more conventional materials. In this respect, a low melting point material such as aluminum oxide or silicon dioxide refractory material or even plain stainless steel may be employed as the liner instead of graphite. In order to reduce the temperature in the primary combustion zone to the desired level the flow rate required for stoichiometric burning. Other flow rates may be employed dependant upon the amount of temperature reduction desired.

As also indicated above, hydrogen is flowed through the annulus 53 for cooling the gas generator; for reducing the temperature of the exhaust gases further to the desired level below 1800° F; and for providing additional hot hydrogen for hydrogenation.

In some instances it may be desirable to flow water through the annulus 53 for cooling purposes instead of hydrogen, although the amount of hydrogen otherwise provided for hydrogenation will be reduced. Water may be flowed through the annulus 53 by providing a solenoid actuated valve 131 and coupling the upper end of a conduit 77 to the valve 131. Valve 131 will be constructed in the same manner as valves 127 and 129. The lower end of the conduit 77 will extend through the upper wall 45 of the outer shell 41 in communication with the space 59 and hence in communication with the annulus 53. In this embodiment the perforations or apertures 76 in conduit 57 will be plugged. Valve 131 has an inlet 147 for allowing the water in the borehole casing to flow to the gas generator annulus 53 by way of conduit 77 and space 59 when the valve 131 is opened. Valve 131 has leads 137 which extend to the surface to solenoid control 145 for controlling the opening and closing of valve 131 from the surface. Control 147 comprises a switch which may be actuated to control the application of electrical energy to the downhole coil of valve 131. In the start-up operation of the gas generator valve 131 is opened after the oxygen and hydrogen valves 129 and 127 are opened. The water will flow into the annulus 53 and through the apertures 63 into the mixing zone 69 for cooling the gas generator and for reducing the temperature of the exhaust gases. In shut down operations of the gas generator, valve 131 is closed after the oxygen and hydrogen valves 129 and 127 are closed. In FIG. 4, components 77, 131, 147, 137 and 145 are shown in dotted form to indicate that they are alternative components. In the embodiment wherein hydrogen is flowed from conduit 57 through apertures 76 into the annulus 53 of the gas generator, conduit 77 will not be employed and its entrance to space 59 through wall 45 will be plugged.

Although in the example described above, a hydrogen-rich mixture of hydrogen and oxygen was burned in the downhole generator 39, it is to be understood that hydrogen may be burned stoichiometrically with oxygen in the gas generator to form steam for injection into the formations for recovering hydrocarbons from the recovery well or wells. In this embodiment preferably water will be introduced into the annulus 53 for cooling purposes.

The uphole gas generator 601 may be constructed similar to the downhole gas generator 39 although the cooling annulus is not needed in the uphole generator since the temperature of the reaction products in the uphole generator may reach only about 2500° F or slightly greater. Since there is no space requirement at the surface, the uphole gas generator may be larger than the downhole gas generator.

Although the system disclosed was described as employing electrical igniters in the uphole and downhole gas generators 601 and 39 respectively, it is to be understood that suitable chemical ignition means may be employed instead for igniting the combustible mixture in the gas generators.

It is to be understood further that a suitable centrifugal or settling device may be employed between the uphole gas generator 601 and the turbine 643 to remove any particulate matter or fall-out carbon formed.

We claim:

1. A system for producing hydrogen for use for recovering hydrocarbons and other fluids from an underground formation containing hydrocarbons and penetrated by an operating borehole comprising:
    generating means for burning hydrocarbons with just enough oxygen to convert substantially all of the carbon of the hydrocarbons to carbon monoxide to form carbon monoxide and free hydrogen,
    reforming means containing a catalyst coupled to said generating means for receiving said carbon monoxide and hydrogen,
    means for adding water or steam to said reforming means to produce carbon dioxide and more hydrogen,
    cooling means for cooling said carbon dioxide and hydrogen produced by said reforming means,
    compressing means for compressing said carbon dioxide and hydrogen from said cooling means,
    removal means coupled to the output of said compressing means for removing said carbon dioxide from the gases flowing from the output of said compressing means to obtain substantially pure hydrogen, and
    means for flowing the hydrogen from said removal means to a utilization device located in said operating borehole at or near the level of said formation.

2. The system of claim 1 comprising:
    a production borehole spaced from said operating borehole and extending down to said formation,
    said utilization device comprising means for employing said hydrogen for generating hot gases for flow into said formation for flowing hydrocarbons from said formation to said production borehole,
    means for recovering hydrocarbons from said production borehole, and
    means for applying a portion of the hydrocarbons recovered to said generating means.

3. The system of claim 2 wherein:
    said utilization device comprises:
        a housing forming a chamber defining a combustion zone,
        said chamber having inlet means for receiving fuel and an oxidizing fluid for forming a combustible mixture of gases in said combustion zone for ignition,
        a restricted lower outlet for the passage of heated gases, and
        a cooling fluid annulus surrounding said chamber, said annulus being in communication with said chamber.

4. The system of claim 1 wherein:
    said generating means comprises:
    a housing forming a chamber defining a combustion zone,
    said chamber having inlet means for receiving fuel and an oxidizing fluid for forming a combustible mixture of gases in said combustion zone for ignition, and
    a restricted outlet for the passage of heated gases from said chamber.

5. The system of claim 4 wherein:
    said utilization device comprises:
        a housing forming a chamber defining a combustion zone,
        said chamber having inlet means for receiving fuel and an oxidizing fluid for forming a combustible mixture of gases in said combustion zone for ignition,
        a restricted lower outlet for the passage of heated gases from said chamber, and
        a cooling fluid annulus surrounding said chamber, said annulus being in communication with said chamber.

6. The system of claim 5 wherein:
    said generating means comprising:
        atomizing means for injecting hydrocarbons in the form of atomized oil into said combustion zone of said chamber for mixing with said oxygen to form a combustible mixture of gases in said combustion zone,
        said atomizing means comprising conduit means having an outlet; an inlet for receiving oil; an an inlet for receiving gas under pressure for atomizing the oil for injection through its outlet into said combustion zone.

7. The system of claim 6 comprising:
    heat exchange conduit means extending from said reforming means to said gas inlet of said atomizing means, and means for flowing water through said heat exchange conduit means for the formation of steam for application to said gas inlet of said atomizing means.

8. The system of claim 1 wherein:

said cooling means comprises a turbine having an input and an output, and means for applying said carbon dioxide and hydrogen produced by said reforming means to the input of said turbine for driving said turbine and for cooling said carbon dioxide and hydrogen.

9. The system of claim 8 comprising:

a cooling device for cooling the carbon dioxide and hydrogen from the output of said turbine, said cooling device having an input for receiving the carbon dioxide and hydrogen from said turbine and an output for application of the carbon dioxide and hydrogen to said compressing means.

10. The system of claim 9 wherein:

said removal means comprises a second cooling device having an input for receiving the carbon dioxide and hydrogen from said compressing means, said second cooling device being operable to liquify the carbon dioxide from said compressing means, said second cooling device having a first outlet for removing liquified carbon dioxide and a second outlet for the passage of hydrogen.

* * * * *